United States Patent Office 3,478,643
Patented Nov. 18, 1969

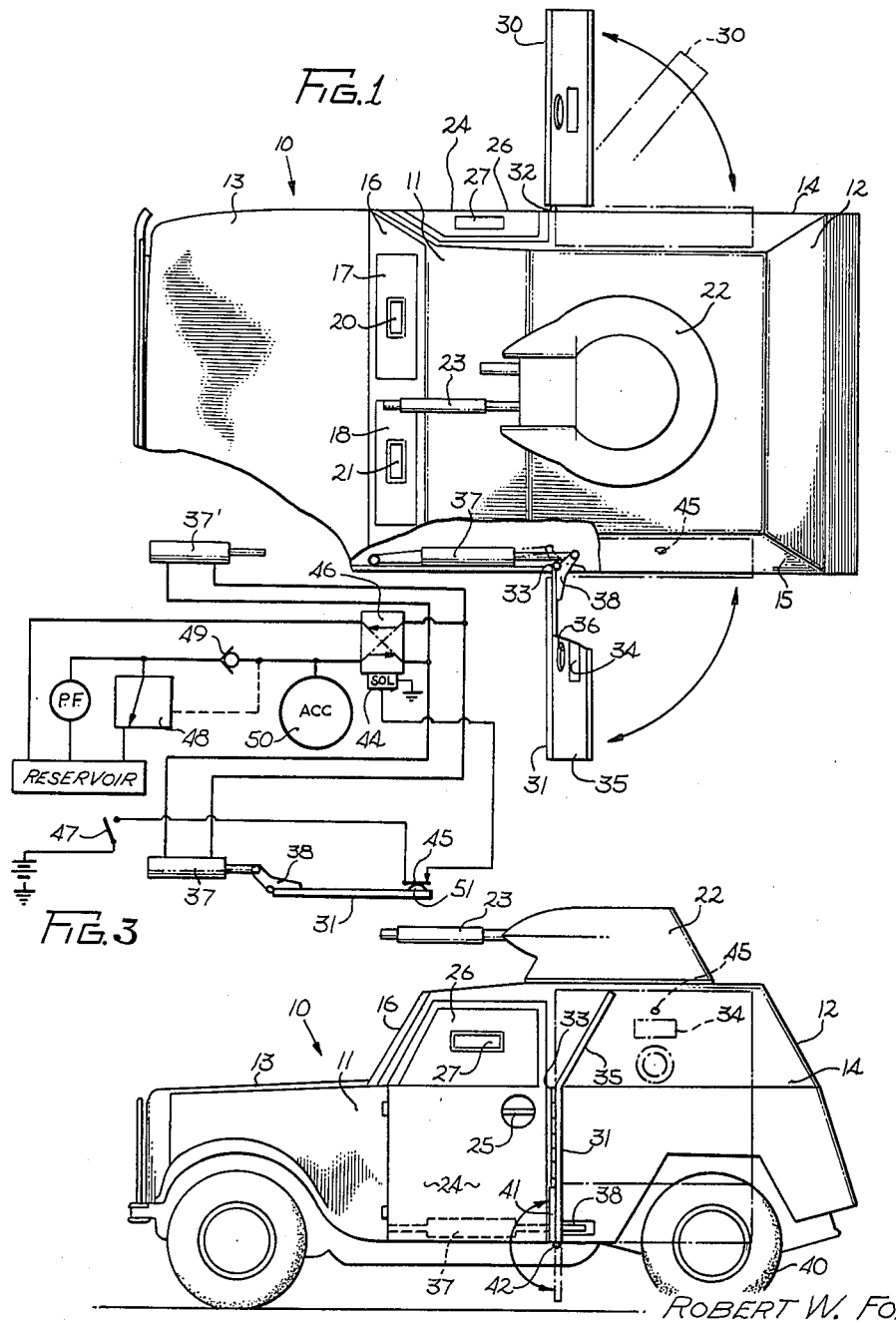

3,478,643
BALLISTIC SHIELDING APPARATUS
Robert W. Forsyth and John P. Forsyth, both of
1517 N. 3rd Ave., Upland, Calif. 91786
Filed Apr. 4, 1968, Ser. No. 718,781
Int. Cl. F41h 5/12, 7/04
U.S. Cl. 89—36                                     13 Claims

ABSTRACT OF THE DISCLOSURE

A ballistic shielding apparatus disclosed herein includes a self-propelled vehicle having at least one laterally extendable shield formed so as to conform with the general contour and silhouette of the vehicle. The shield is composed of material suitable for repelling or absorbing impact loads encountered by impinging ballistic missiles, such as rocks, bullets, or the like. The shield is hingeably connected to the vehicle, and the apparatus includes a key-lock system employing electro-hydraulic components for selectively advancing and retracting the shield to and from predetermined positions laterally of the vehicle.

BACKGROUND OF THE INVENTION

Field of the invention

This invention relates to personnel protection devices and, more particularly, to a novel personnel ballistic shielding apparatus carried on a mobile unit and including an electro-hydraulic means adapted to advance and retract the shield laterally of the mobile unit.

Description of the prior art

It has been a long-standing quest on the part of armorers to provide suitable protection for personnel engaged in dangerous activities in which bodily injury or harm may result from flying missiles, small arms fire, or other projectiles traveling at ballistic speeds. One attempt to adequately protect such personnel resides in encasing the individual or selected portions of his body in a protective material. However, the body movement of the individual is generally restricted, and major portions of his body are exposed. Another attempt has been to provide armored vehicles, such as tanks, personnel carriers, scout cars or the like for completely housing the individual; however, protection to the individual is afforded only when he remains in the vehicle, and no protection is available once he leaves the vehicle, even if his mission requires his presence in close proximity to the vehicle.

In some present-day military missions and in instances of civil disturbances involving riot control, supporting personnel are exposed to harassing weapons fire unless they are able to gain suitable cover behind the vehicle's silhouette. Even under the most ideal circumstances, using the vehicle for protective cover results in a less than optimum firing position for such supporting personnel. Although armored vehicle are generally equipped with conventional access doors, hatches or panels that may be employed to partially shield supporting personnel, this equipment is not coordinated with the major portion of the vehicle so as to be selectively actuated and maintained in an advanced or extended position whereby inadvertent closure of the door or hatch is prevented.

SUMMARY OF THE INVENTION

Accordingly, the ballistic shielding apparatus of the present invention obviates the above-mentioned problems by providing a mobile armored vehicle having selectively extendable panels or shields adapted to be powered for advancement outwardly from the opposite sides of the vehicle and retractable into nested relationship with the vehicle so as to merge into the overall silhouette thereof. In its advanced position, personnel may walk or stand behind the panel and have complete and unrestricted freedom to perform a supporting mission. Means are provided at the upper and lower portions of the panel to insure adequate shielding of the personnel stationed therebehind so that the head and shoulders are protected as well as the legs of the individual. Means are formed in each panel permitting use of individual weapons carried by supporting personnel.

A key-type switch is incorporated into an electro-hydraulic control system adapted to prevent closure of the panels from inside the vehicle when the void behind the panel is occupied by supporting personnel. Preferably, the actuating means is adapted to position the panels into one of two positions, depending upon the requirements of the personnel based on evaluation of the mission or immediate situation.

Therefore, it is among the primary objects of the present invention to provide a novel personnel shielding means carried by a self-propelled vehicle adapted to shield the full length of an individual therebehind so that the individual may stand or walk in close proximity to the vehicle and be protected from oncoming missiles, rocks or the like.

Another object of the present invention is to provide a self-propelled vehicle having extendable shields adapted to protect individuals therebehind, including electro-hydraulic means for advancing and retracting the shields laterally of the vehicle.

Another object of the present invention is to provide a fail-safe interlocking means included in the electro-hydraulic system whereby the shield cannot be closed from inside the vehicle when the space immediately behind the shield is occupied by supporting personnel.

Yet another object of the present invention is to provide a ballistic shielding apparatus adapted to be selectively advanced and retracted to and from the sides of the vehicle behind which supporting personnel are adequately protected and including a key-lock switch so that closure of the panels is under control of the individual stationed behind the panel.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a top-plan view of a vehicle incorporating the ballistic shield of the present invention illustrating the shields in their furthermost advanced position in solid lines and in an intermediate position in broken lines;

FIGURE 2 is a side-elevational view of the vehicle shown in FIGURE 1 illustrating an extendable panel carried on the lower end of the shield; and FIGURE 3 is a schematic illustration of the electro-hydraulic system including the key-lock switch for selectively advancing and retracting the ballistic shield.

DESCRIPTION OF THE PREFERRED EMBODIMENT

Referring to FIGURE 1, a self-propelled mobile armored vehicle is indicated in the general direction of arrow 10 which incorporates the ballistic shielding apparatus of the present invention. The vehicle 10 includes a body portion 11, including a downwardly sloping rear end 12 and a hook portion 13 at the front end of the vehicle. Disposed between ends 12 and 13, the body is formed with inclined sloping side portions 14 and 15, respectively, which merge at their forward ends with a sloping front wall 16. The front wall 16 includes removable hatch covers 17 and 18, each having a viewing port 20 and 21, respectively, formed therein.

The top of body 11 is employed to mount a movable turret 22 adapted to rotate 360° and which carries a suitable gun or cannon 23.

Each side of the vehicle 10 includes an access door 24 adapted to be opened and closed manually by means of a suitable recessed door handle 25, as shown in FIGURE 2. Each door includes an upper portion 26 angled to conform with the inclined side wall portions 14 and 15 of the body and which further includes a viewing port 27.

Disposed on each side of the vehicle 10 are a pair of ballistic shields 30 and 31, respectively. Each shield is movably attached to the side of body 11 by means of hinges 32 and 33 so that the shields may be pivotally extended outwardly and laterally of the vehicle side. As indicated in solid lines, each shield may be extended to an advanced position where the shield is relatively perpendicular to the side of the vehicle so that a substantial area is defined immediately behind the shield which can be occupied by supporting personnel. Each ballistic shield includes a viewing port 34 formed in an inclined portion 35 so that personnel immediately behind the shield may have forward viewing accommodation. Also formed in the shield portion 35 is a weapons port 36 through which the supporting personnel may train and fire their weapons.

The sloping portions 35 of each shield is configured to merge or nest with the inclined side wall portions 14 and 15 of the body 11 when the shields are positioned against the sides of the body. When in this position, the body is completely enclosed and the shields serve as additional wall thickness for the vehicle. However, as shown in broken lines in connection with shield 30, the shield may be maintained in an intermediate position which is at an obtuse angle with respect to the side of the vehicle in the event the supporting personnel's mission so requires.

In connection with shield 31, the side of the vehicle is partially broken away to expose a hydraulic piston and cylinder assemblage 37 constituting an actuator having one end connected to a lever 38 which is pivotally carried on hinge 33 and fixedly secured to the inside of the shield 31.

Referring now to FIGURE 2, the shield 31 is shown in solid lines fully extended, while in broken lines fully retracted against the side of the vehicle. It can be seen that the upper portion 35 is inclined inwardly of the main vertical central portion of the shield 31 so that protection of an individual behind the shield is afforded from missiles launched from an elevated position. In its fully retracted condition, a portion of the shield covers a rear tire 40. Preferably, the shields are not employed as an access door or hatch through which ingress and egress of the body 11 can be had. However, it is within the scope of the invention to provide a port in the side wall of body 11 to permit such access when the shield is fully extended.

It is to be noted that the lower portion of the shield 31 includes an extendable plate or section 41 which is rotatably mounted on the lower extremity of the shield by a hinge 42. When the shield has been extended to either its intermediate position or its fully advanced position, the section 41 may be released from its position shown in solid lines so that it may drop to the position shown in broken lines. When in this latter position, the section protects the legs of an individual behind the shield.

Referring now to FIGURE 3 in detail, an electro-hydraulic actuation system is shown for advancing and retracting the shields 30 and 31, respectively. Means are also included for selectively operating the shields so that an individual stationed behind the shield will not be trapped or otherwise endangered by inadvertent closure of the shield.

When a shield is closed, a key-lock switch 45 is closed and a completed circuit to a solenoid 44 incorporated in a three-position spool valve 46 may be made by the vehicle operator by manually closing switch 47 located in the driver's compartment adjacent door 24. When the circuit is completed, the solenoid in valve 46 is actuated, which steps the valve spool from a neutral position to a position shown in solid lines in the valve body. Hydraulic fluid is then supplied to the cylinders 37 and 37′ associated with shields 31 and 30, respectively. As the shields are advanced, switch 45 opens, breaking the electrical circuit to the solenoid of the valve 46. A pilot pressure accumulator unloading valve 48 is included in the hydraulic circuit as well as a check valve 49 and an accumulator 50.

To retract or close the shield, a key carried by the individual external of the vehicle is inserted into a lock forming a part of switch 45 so that when the key is rotated in the lock, contacts within switch 45 are closed momentarily so as to complete the circuit to the solenoid. The solenoid steps the spool of valve 46 to its retracting position shown by dotted lines in the valve body. The key is removed as the shield closes, again breaking the electrical circuit of the solenoid at switch 45. When the shield is fully closed, switch 45 is again closed by a cam device 51 on the inside surface of the shield that rotates. With the switch 45 closed, circuit to the solenoid is closed, and the solenoid steps valve 46 to the original neutral position. The operator of the vehicle may then open switch 47 in the driver's compartment to break the circuit to the solenoid and the system is ready to cycle again. Construction in this manner provides complete control for shield actuation by the personnel stationed in the space behind the shield. At no time can the shield be retracted by the driver without the positive cooperation of the individual behind the shield through his key in combination with the switch lock 45.

Therefore, it can be seen that the ballistic shielding apparatus of the present invention provides a means of individual personnel protection external of the vehicle when such personnel are performing supporting missions requiring their presence in close proximity to the vehicle. A protective area is defined between the backside of the shield and the side of the vehicle which may be occupied by supporting personnel. The shields are selectively activated for extension and retraction and may be located in an intermediate position or a fully advanced position at the choice of the individual occupying the space directly behind the shield. The control of the electro-hydraulic actuating system is in the hands of the individual behind the shield by means of the key-lock switch 45. The individual's head and shoulders are protected by the inclined shield portion 35, while the lower extremities are protected by the apron or shield section 42. If preferred, additional extendable sections can be provided along the outer edge of the shield and along the top of the shield which may be readily deployed to further enclose personnel behind each shield. However, when the shields are fully retracted, the overall silhouette of the vehicle is undisturbed, since the configuration of each shield will nest or conform to the overall configuration of the body 11.

What is claimed is:
1. Ballistic shielding apparatus comprising:
 a self-propelled vehicle having a body of predetermined configuration;
 at least one shield movably carried on said body adapted to be advanced outwardly from said body so as to define a personnel protection area between said shield and said body;
 means carried on said body and operably coupled to said shield for selectively moving said shield away from and back to said body; and said moving means includes an electro-hydraulic actuator means having a switch means exposed exteriorly of said body in communication with the inside surface of said shield when said shield is in its fully retracted position against said body.

2. The invention as defined in claim 1 wherein said shield is formed with a contour adapted to mate in corresponding relationship with said body so as to assume said predetermined configuration.

3. The invention as defined in claim 1 wherein said shield includes an upper portion disposed with respect to the major portion thereof at an inwardly inclining angle towards said body; and
a section movably connected to the lower end of said shield adapted to selectively extend the length of said shield.

4. In combination with a mobile armored vehicle having a body including opposite sides wherein the upper portion of the sides are inwardly inclined so as to provide a predetermined configuration, the improvement which comprises:
a personnel protective shield hingeably carried on each side of said body adapted to move laterally thereof to an advanced position so as to define a protection area between the backside of said shield and the adjacent side of said body;
actuating means carried in said body and operably coupled to advance and retract said shields; and
key means operable in cooperation with said actuating means to selectively move each of said shields externally of said body.

5. The invention as defined in claim 4 wherein each of said shields includes an upper portion formed at an obtuse angle with respect to its major central portion and adapted to nest in corresponding and conforming relationship to said body predetermined configuration when said shield is fully retracted against the adjacent side of said body.

6. The invention as defined in claim 5 wherein each of said shields includes an extendable section pivotally carried on its lower end adapted to be stored against said shield in a first position and adapted to be pivoted into a second position so as to form a coextension of said shield.

7. The invention as defined in claim 4 wherein said last mentioned means includes a switch means for controlling movement of said shields.

8. Ballistic shielding apparatus comprising:
a self-propelled vehicle having a body of predetermined configuration;
a pair of shields movably carried on said body adapted to be advanced outwardly from opposite sides of said body so as to define a personnel protection area between said shields and said body;
hinge means rotatably securing each of said shields to the respective sides of said body;
means including piston and cylinder assemblages carried on said body and operably coupled to said shields for selectively moving said shields away from and back to said body;
a solenoid operated valve coupled in said moving means between said piston and cylinder assemblages; and
a switch means operably connected to said valve for controlling movement of said shields.

9. In combination with a mobile armored vehicle having a body including opposite sides wherein the upper portion of the sides are inwardly inclined so as to provide a predetermined configuration, the improvement which comprises:
a personnel protective shield of greater height than width hingeably carried on each side of said body terminating at its opposite ends adjacent the top and bottom of said body and adapted to move laterally thereof to an advanced position so as to define a protection area between the backside of said shield and the adjacent side of said body;
actuating means carried in said body to advance and retract said shields;
means operably connecting said shields to said actuating means including a bell crank lever secured to said shield at one end and pivotally coupled at its other end to said actuating means so that an unobstructive protection area directly behind each of said shields is produced whereby personnel may occupy said protection area in close proximity to the hingeable joining of said shields to said body; and
each of said bell crank levers is hingeably coupled at its mid-section to said body.

10. The invention as defined in claim 9 including key means operable in cooperation with said actuating means for selectively moving said shields externally of said body.

11. The invention as defined in claim 10 wherein said last mentioned means includes a switch means adapted to be operated by personnel occupying said protection areas.

12. The invention as defined in claim 9 wherein said switch means includes a key-lock adapted to selectively activate said switch means in response to full retraction of said shield or in response to insertion of a key.

13. The invention as defined in claim 12 wherein each of said shields is formed with a viewing port and a weapons port in close proximity thereto.

References Cited

UNITED STATES PATENTS

| | | |
|---|---|---|
| 1,150,748 | 8/1915 | Doyle. |
| 1,887,932 | 11/1932 | Ketonen. |
| 2,200,230 | 5/1940 | Hojnowski. |
| 2,382,862 | 8/1945 | Davis. |

FOREIGN PATENTS

| | | |
|---|---|---|
| 7,265 | 1888 | Great Britain. |

BENJAMIN A. BORCHELT, Primary Examiner

STEPHEN C. BENTLEY, Assistant Examiner